AUTOMATIC-PICTURE-CONTROL CIRCUIT FOR A TELEVISION RECEIVER
Filed March 12, 1963
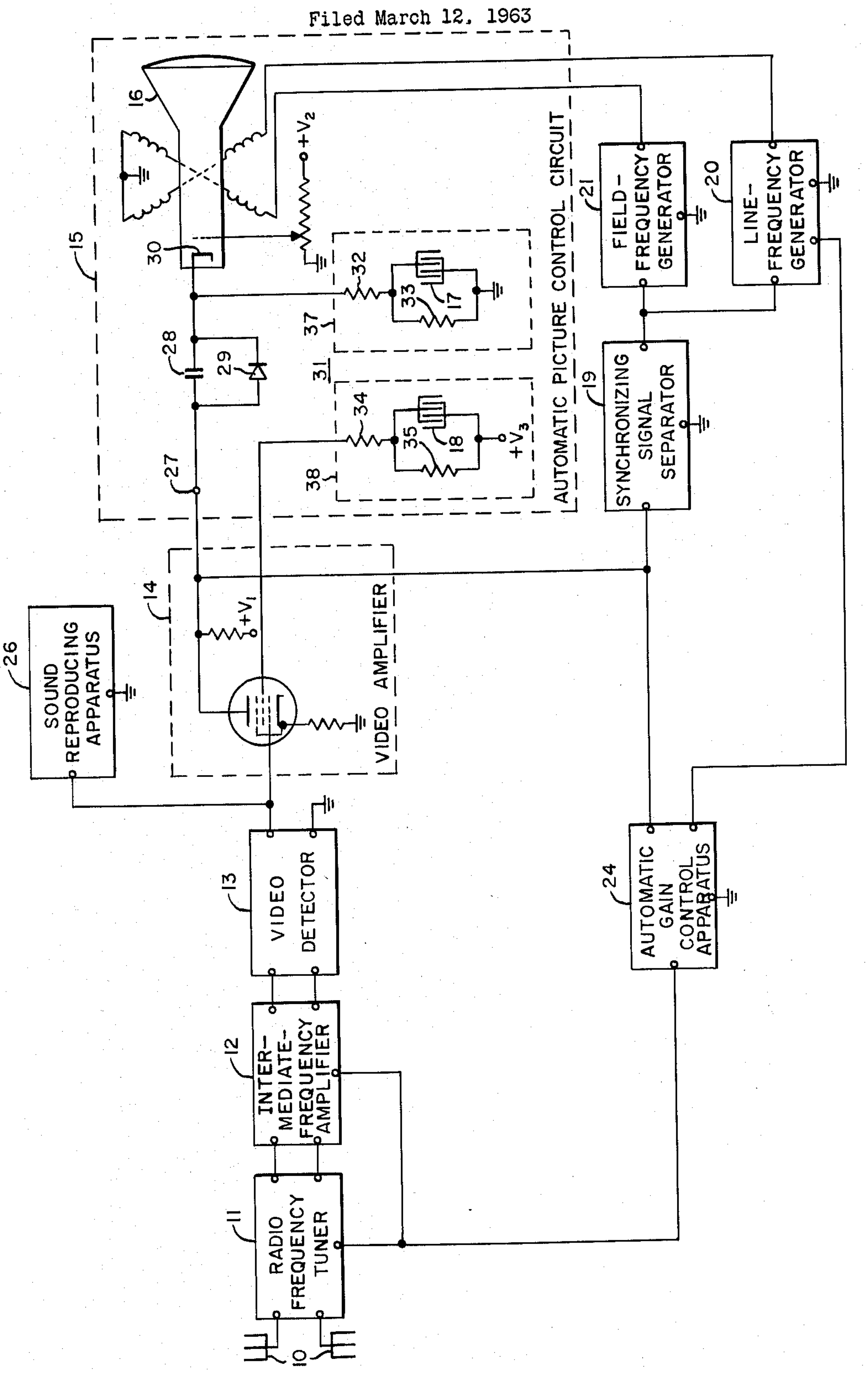

United States Patent Office 3,258,532
Patented June 28, 1966

3,258,532
AUTOMATIC-PICTURE-CONTROL CIRCUIT FOR A TELEVISION RECEIVER

Bernard D. Loughlin, Huntington, N.Y., and Stephen P. Ronzheimer, Elmhurst, Ill., assignors to Hazeltine Research, Inc., a corporation of Illinois
Filed Mar. 12, 1963, Ser. No. 264,656
9 Claims. (Cl. 178—7.5)

The present invention relates to a television receiver automatic-picture-control circuit and is particularly directed to an improvement in the comfort of viewing versus ambient lighting characteristic provided by such a receiver.

One of the major factors affecting comfortable television viewing is ambient lighting conditions. A low level of picture brightness is sufficient in a dimly lit room, whereas a high level of picture brightness is required in a brightly lit room. But, if the ambient light level is low and the picture brightness is high, irritating glare often results. Conversely, if the ambient light level is high and the picture brightness is low, the distinguishability of shades near black and the degree of crispness of the reproduced picture image suffers. Therefore, it would be desirable to include in the television receiver some method of regulating picture brightness in order to compensate for the annoying subjective effects so produced.

One form of conventional receiver utilizes a light-sensitive device to vary the level of brightness in accordance with ambient lighting conditions. Connected so as to adjust the bias voltage at the image-reproducing device, this light-sensitive device operates to cause picture brightness to increase with increasing ambient light, thereby improving picture distinguishability and crispness. In a like manner, the device operates to decrease picture brightness with decreasing ambient light, thereby reducing the possibility of irritating glare. However, this receiver has the disadvantage that, since it utilizes capacitive coupling arrangements between the video detector stage and the picture tube stage, the black level of the transmitted television signal would be reproduced correctly for one average brightness signal only under any selected ambient lighting condition.

Another form of receiver utilizes a similar picture brightness compensating scheme but employs a direct-current (D.-C.) coupling arrangement instead of a capacitive or alternating-current (A.-C.) coupling arrangement between video detector and picture tube. Besides reducing glare and improving picture distinguishability, accurate reproduction of the transmitted picture image is enhanced since both the D.-C. and A.-C. components, representative of the average and instantaneous picture brightness respectively, are present at the cathode-ray reproducing device. Such an arrangement, however, creates a problem of its own that should be compensated for maximum viewing comfort. This problem is that with D.-C. coupling a high brightness scene can prove annoying, especially if it immediately follows a scene of low brightness, and particularly if the ambient light level is low.

It is therefore an object of the present invention to provide an automatic-picture-control circuit for a television receiver that improves picture reproduction, particularly in the presence of adverse ambient lighting conditions.

In accordance with the invention, an automatic-picture-control circuit for a television receiver comprises means for supplying a television signal including a picture-representative portion. The automatic-picture-control circuit also includes means including a cathode-ray tube for reproducing the picture from the signal portion and means for coupling the signal portion to the cathode-ray tube to effectively maintain black level in the reproduced picture over at least a range of average brightness levels in the picture signal. The control circuit further includes means for varying this range of average brightness levels over which black level is maintained in accordance with ambient lighting conditions.

For a better understanding of the present invention, together with other and further objects thereof, reference is had to the following description taken in connection with the accompanying drawing, and its scope will be pointed out in the appended claims.

Referring to the single figure of the drawing, there is shown a circuit diagram, partly schematic, of a television receiver embodying a particular form of the present invention.

GENERAL

In the television receiver shown in the drawing a radio-frequency television signal is received by an antenna system 10 and coupled to radio-frequency tuner 11 wherein it is converted to an intermediate-frequency and coupled through intermediate-frequency amplifier 12 to a video detector circuit 13 from which are derived a sound component and a video component. The sound modulated intercarrier beat note component is applied to sound reproducing apparatus 26 wherein it is amplified, detected, and reproduced by the sound reproducing device. The video signal component, conventionally including a picture representative portion and a synchronizing portion, is amplified in video amplifier 14 and applied to an automatic-picture-control circuit 15, constructed in accordance with the present invention and to be described in greater detail hereinafter. Briefly, however, circuit 15 includes a cathode-ray type of image-reproducing device 16 and a circuit including light-sensitive resistors 17 and 18 to improve picture reproduction, particularly in the presence of adverse ambient lighting conditions. The video or television signal at the output of video amplifier 14 is also applied to the input of a synchronizing signal separator 19 wherein the synchronizing pulses are separated and applied to line frequency generator 20 and field frequency generator 21. Generators 20 and 21 serve to derive horizontal and vertical deflection signals which are then coupled to the deflection windings of image-reproducing device 16 to control beam deflection in the usual manner. Automatic-gain-control (AGC) apparatus 24 is further coupled to amplifier 14 and includes a rectifier circuit keyed to operate by flyback pulses from generator 20. The arrangement may be such that the AGC signal developed in apparatus 24 is derived from the blanking level which follows the synchronizing pulse portion of the television signal instead of from the peaks of the synchronizing pulses as is conventionally done. This results in improved black level operation at cathode-ray tube 16. A more complete description of such back porch keyed AGC circuits is given in copending applications, Serial No. 223,493 and Serial No. 223,494, each filed September 13, 1962, and entitled "Control Apparatus for a Television Receiver."

*Automatic-picture-control circuit 15*

Referring now more particularly to the automatic-picture-control circuit 15 which embodies one form of the present invention, the arrangement there represented comprises means such as video amplifier 14 connected to input terminal 27 for supplying a television signal including a picture representative portion. Circuit 15 also includes means for coupling the above-mentioned television signal to cathode-ray tube 16 for reproducing the picture-representative portion thereof. This coupling is accomplished by the parallel circuit consisting of capacitor 28 and diode 29 connected between input terminal 27 and cathode 30 of cathode-ray tube 16. This arrangement, combined with the AGC systems described in the aforementioned copending applications, makes it possible to maintain black level in the reproduced picture over a predetermined range of average brightness levels in the picture signal and more particularly, over a range whose upper level is limited by the maximum value of beam current in cathode ray tube 16. This range of average brightness levels may, for example, be a restricted range extending from black to some intermediate average brightness level. Thus black level is maintained on low average brightness levels and black level in the picture signal is suppressed on high average brightness levels. Copending application Serial No. 215,964, filed August 9, 1962, and entitled, "Black Level Stabilization System for a Television Receiver," more fully describes this coupling circuit.

Automatic-picture-control circuit 15, further includes means 31, including at least one light-sensitive device, for varying the aforementioned range of average brightness levels over which black level is maintained. Specifically, means 31 includes one or both of the two series-parallel circuits 37, 38, the resistance of each being a function of ambient light. Circuit 37, consisting of resistor 32 in series with the parallel combination of resistor 33 and light-sensitive resistor 17, is utilized in the cathode circuit of cathode-ray tube 16 to adjust or limit the maximum value of beam current therein in accordance with ambient lighting conditions. Circuit 38, consisting of resistor 34 in series with the parallel combination of resistor 35 and light-sensitive resistor 18, is located in the contrast control circuit of video amplifier 14 and is employed to adjust the amplitude of the applied television signal in accordance with ambient lighting conditions. Light-sensitive resistors 17 and 18 may be semiconductor devices whose resistance varies inversely with ambient lighting conditions.

The manner in which cathode-ray tube 16 is connected within automatic-picture-control circuit 15 provides for effectively maintaining black level in the reproduced picture over at least a range of average brightness levels in the picture signal—a range which extends from black to an intermediate level less than maximum white. Such an arrangement also provides D.-C. coupling of video amplifier 14 to cathode-ray tube 16 for a range of low average brightness levels, gradually changing to almost pure A.-C. coupling for a range of high average brightness levels. In addition, the method of connection allows the range of average brightness levels over which D.-C. coupling is maintained to be adjusted in accordance with ambient lighting conditions, to result in comfortable television viewing, while at the same time maintaining black level constant on the subjectively important low average brightness scenes.

The operation of control circuit 15 will first be considered with circuit 38 replaced by a fixed resistor. As is more fully described in the aforementioned copending application, Serial No. 215,964, the point at which the transition from D.-C. coupling to A.-C. coupling occurs is established by the circuit constants of network 37 which limit the maximum beam current capable of flowing in cathode-ray tube 16. Specifically, the maximum beam current that can flow is determined by, and inversely related to, the effective resistance between picture tube cathode 30 and ground. That is, the larger the effective resistance, the lower the beam current at transition and vice versa.

Since the maximum beam current determines the upper level of the range of average brightness levels over which black is stabilized in the reproduced picture variations in effective resistance will shift this level either up or down, i.e., will either extend or narrow this range. Therefore, due to the presence of light-sensitive resistor 17 in circuit 37, the effective resistance between cathode 30 and ground varies in accordance with changes in ambient lighting conditions. At low ambient light levels, this resistance can be represented by $(R_{32}+R_{33})$ while at high levels of ambient light, the effective resistance can be represented by $$R_{32}+\left(\frac{R_{17}\times R_{33}}{R_{17}+R_{33}}\right)$$

Thus, an increase in ambient light has the effect of decreasing the resistance between cathode and ground. The maximum value of beam current possible is thereby increased with the result that the upper level of the range of average brightness levels over which black is maintained is also increased. Video amplifier 14 then remains D.-C. coupled to cathode-ray tube 16 over a wider range of average brightness levels than if the ambient light level were low. This increase in beam current with increasing ambient light improves the low level of picture distinguishability and more specifically, the low level of distinguishability of shades near black, which would exist if the television receiver were operating in a brightly lit room. Conversely, a decrease in ambient light has the effect of increasing the resistance between cathode 30 and ground. The maximum value of beam current possible is thereby decreased resulting in a decrease in the upper level of the range of average brightness levels over which black is stabilized. Video amplifier 14, therefore, remains D.-C. coupled to cathode-ray tube 16 over a narrower range of average brightness levels than if the ambient light level were high. In other words, the transition from D.-C. coupling to A.-C. coupling occurs on a scene of lower average brightness value.

This decrease in beam current with decreasing ambient light reduces the irritating glare effect produced when a high brightness scene follows a low brightness scene, particularly if the surrounding ambient light level were low. Thus, light-sensitive resistor 17 located in the beam current path of cathode-ray tube 16 operates to make television viewing more comfortable.

The operation of control circuit 15 will now be considered with circuit 37 replaced by a fixed resistor but with circuit 38 constructed as in the drawing. Due to the presence of light-sensitive resistor 18 in circuit 38, the effective resistance in the screen grid circuit of video amplifier 14 varies in accordance with changes in ambient lighting conditions in a fashion similar to the manner in which the effective resistance between cathode 30 and ground in circuit 37 varies due to light-sensitive resistor 17. That is, at low ambient light levels, the effective resistance in the screen grid circuit could be represented by $(R_{34}+R_{35})$ while at high levels of ambient light, the effective resistance could be represented by $$\left(R_{34}+\frac{R_{18}\times R_{35}}{R_{18}+R_{35}}\right)$$

Thus, an increase in ambient light has the effect of decreasing the resistance, thereby increasing the picture contrast. The amplitude of the video signal supplied to input terminal 27 is thereby increased but, due to the operation of AGC unit 24, the blanking level of the video signal remains unchanged. More picture tube beam current flows with the ensuing result that the transition from D.-C. coupling to A.-C. coupling occurs on a scene of lower average brightness than would be required for transition to occur if the ambient light level were low. This effectively decreases the range of average brightness levels over which black level is maintained in the reproduced picture. Furthermore, the increase in beam current with increasing ambient light has the effect of improving picture distinguishability and crispness, particularly if the average brightness level of the transmitted scene were low.

Conversely, a decrease in ambient light has the effect of increasing the resistance in the screen grid circuit of video amplifier 14, thereby decreasing the picture contrast. The amplitude of the supplied video signal is thereby decreased, but, once again, because of AGC unit 24, the blanking level of the video signal remains constant. Less picture tube beam current flows and transition does not occur until the reception of a television signal of higher average brightness than would be required to cause transition to occur if the ambient light level were high. In this manner, the range of average brightness levels over which black is maintained in the reproduced picture is increased. This decrease in beam current with decreasing ambient light additionally reduces the annoying glare effect produced when a high brightness scene follows a low brightness scene, particularly if the ambient light level were low. Once again, therefore, the use of a light-sensitive resistor, though located in the contrast control circuit of the television receiver, can make television viewing more comfortable.

Whereas each series parallel variable resistance circuit has been described independently, it is understood that they can be used in combination wherein each will operate substantially as has just been described. It should be noted, however, that the effect of light-sensitive resistor 17 is to increase the range of average scene brightnesses over which black level is maintained as the ambient light level is increased, while the effect of light-sensitive resistor 18 is just the opposite. Therefore, by proper choice of circuit constants, when using both light-sensitive resistors 17 and 18, the variation in the range of average brightnesses over which black level is maintained versus ambient lighting can be controlled to have a desired function, including a fixed relationship.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An automatic-picture-control circuit for a television receiver comprising:
- means for supplying a television signal including a picture-representative portion;
- means including a cathode-ray tube for reproducing said picture from said signal portion;
- means for coupling said signal portion to the cathode-ray tube to effectively maintain black level in the reproduced picture over a portion of the range of average brightness levels in the picture signal;
- and means for varying said portion of the range of average brightness levels over which black level is maintained in accordance with ambient lighting conditions.

2. An automatic-picture-control circuit for a television receiver comprising:
- means for supplying a television signal including a picture-representative portion;
- means including a cathode-ray tube for reproducing said picture from said signal portion;
- means for coupling said signal portion to the cathode-ray tube to effectively maintain black level in the reproduced picture over a portion of the range of average brightness levels in the picture signal;
- and means including at least one light-sensitive device for varying said portion of the range of average brightness levels over which black level is maintained in accordance with ambient lighting conditions.

3. An automatic-picture-control circuit for a television receiver comprising:
- means for supplying a television signal including a picture-representative portion;
- means including a cathode-ray tube for reproducing said picture from said signal portion;
- means for coupling said signal portion to the cathode-ray tube to effectively maintain black level in the reproduced picture over a portion of the range of average brightness levels in the picture signal, the upper level of said portion of the range corresponding to a selected maximum value of beam current in the cathode-ray tube;
- and means for adjusting the selected maximum value of beam current in the cathode-ray tube in accordance with ambient lighting conditions, whereby said portion of the range of average brightness levels over which black level is maintained is varied.

4. An automatic-picture-control circuit for a television receiver comprising:
- means for supplying a television signal including a picture-representative portion;
- means including a cathode-ray tube for reproducing said picture from said signal portion;
- means for coupling said signal portion to the cathode-ray tube to effectively maintain black level in the reproduced picture over a portion of the range of average brightness levels in the picture signal, the upper level of said portion of the range corresponding to a selected maximum value of beam current in the cathode-ray tube;
- and means including a circuit having a light-sensitive resistor, said circuit being coupled to the cathode of the cathode-ray tube for varying the selected maximum value of beam current in said tube in accordance with ambient lighting conditions.

5. An automatic-picture-control circuit for a television receiver comprising:
- means for supplying a television signal including a picture-representative portion;
- means including a cathode-ray tube for reproducing said picture from said signal portion;
- means for coupling said signal portion to the cathode-ray tube to effectively maintain black level in the reproduced picture over a portion of the range of average brightness levels in the picture signal;
- and means for adjusting the amplitude of said supplied television signal in accordance with ambient lighting conditions, whereby said portion of the range of average brightness levels over which black level is maintained is varied.

6. An automatic-picture-control circuit for a television receiver comprising:
- means for supplying a television signal including a picture-representative portion;
- means including a cathode-ray tube for reproducing said picture from said signal portion;
- means for coupling said signal portion to the cathode-ray tube to effectively maintain black level in the reproduced picture over a portion of the range of average brightness levels in the picture signal;
- and means including a circuit having a light-sensitive resistor, said circuit being coupled to said means for supplying a televiison signal for varying the amplitude of said television signal in accordance with ambient lighting conditions, whereby said portion of the range of average brightness levels over which black level is maintained is varied.

7. An automatic-picture-control circuit for a television receiver comprising:
- means for supplying a television signal including a picture-representative portion;
- means including a cathode-ray tube for reproducing said picture from said signal portion;
- means for coupling said signal portion to the cathode-ray tube to effectively maintain black level in the reproduced picture over a portion of the range of average brightness levels in the picture signal, the upper level of said range corresponding to a selected maximum value of beam current in said cathode-ray tube;
- and means for adjusting the selected maximum value of beam current in the cathode-ray tube and the amplitude of said supplied television signal in accordance with ambient lighting conditions, whereby said portion of the range of average brightness levels over which black level is maintained is varied.

8. An automatic-picture-control circuit for a television receiver comprising:

means for supplying a television signal including a picture-representative portion;

means including a cathode-ray tube for reproducing said picture from said signal portion;

means for coupling said signal portion to the cathode-ray tube to effectively maintain black level in the reproduced picture over a portion of the range of low average brightness levels in the picture signal and to suppress black level in the reproduced picture over a portion of the range of high average brightness levels in the picture signal;

and means for varying said portion of the range in accordance with ambient lighting conditions.

9. An automatic-picture-control circuit for a television receiver comprising:

means for supplying a television signal including a picture-representative portion;

means including a cathode-ray tube for reproducing said picture from said signal portion;

means for coupling said signal portion to the cathode-ray tube to effectively maintain black level in the reproduced picture over a portion of the range of average brightness levels in the picture signal extending from black to an intermediate level less than maximum white;

and means for varying said portion of the range in accordance with ambient lighting conditions.

References Cited by the Examiner

UNITED STATES PATENTS

| | | | |
|---|---|---|---|
| 1,281,404 | 12/1961 | French | 178—7.5 |
| 3,025,345 | 3/1962 | Suhrmann | 178—7.5 |
| 3,112,424 | 9/1963 | Suhrmann | 178—7.5 |

DAVID G. REDINBAUGH, *Primary Examiner.*

J. McHUGH, *Assistant Examiner.*